(12) United States Patent
Wu (10) Patent No.: US 11,624,423 B2
(45) Date of Patent: Apr. 11, 2023

(54) CHAIN AND TRANSMISSION MECHANISM HAVING THE SAME

(71) Applicant: KMC CHAIN INDUSTRIAL CO., LTD., Tainan (TW)

(72) Inventor: Daniel Wu, Tainan (TW)

(73) Assignee: KMC Chain Industrial Co., Ltd., Tainan (TW)

( * ) Notice: Subject to any disclaimer, the term of this patent is extended or adjusted under 35 U.S.C. 154(b) by 144 days.

(21) Appl. No.: 17/382,745

(22) Filed: Jul. 22, 2021

(65) Prior Publication Data
US 2022/0042575 A1 Feb. 10, 2022

(30) Foreign Application Priority Data
Aug. 10, 2020 (TW) .................................. 109127079

(51) Int. Cl.
*F16G 13/06* (2006.01)
*F16G 15/14* (2006.01)

(52) U.S. Cl.
CPC ............. *F16G 13/06* (2013.01); *F16G 15/14* (2013.01)

(58) Field of Classification Search
CPC ................................. F16G 13/06; F16G 15/14
USPC ......................................................... 474/231
See application file for complete search history.

(56) References Cited

U.S. PATENT DOCUMENTS

| | | | | |
|---|---|---|---|---|
| 4,265,134 A * | 5/1981 | Dupoyet | ................. | F16G 13/06 59/8 |
| 5,203,745 A * | 4/1993 | Wang | ....................... | F16G 13/06 474/213 |
| 5,226,857 A * | 7/1993 | Ono | ......................... | B62M 9/06 474/231 |
| 9,939,045 B2 * | 4/2018 | Fukumori | ............... | F16G 13/06 |
| 2016/0153526 A1 * | 6/2016 | Wang | ....................... | F16G 13/06 474/226 |

FOREIGN PATENT DOCUMENTS

| | | |
|---|---|---|
| JP | S52158252 U | 12/1977 |
| JP | S53151062 U | 11/1978 |
| JP | H1038035 A | 2/1998 |

OTHER PUBLICATIONS

Search Report appended to an Office Action, which was issued to Taiwanese counterpart application No. 109127079 by the TIPO dated Apr. 26, 2021 with an English translation thereof.

* cited by examiner

*Primary Examiner* — Gene O Crawford
*Assistant Examiner* — Emily R Kincaid
(74) *Attorney, Agent, or Firm* — Burris Law, PLLC (57) ABSTRACT

A transmission mechanism includes a chain. The chain includes a plurality of inner link units and a plurality of outer link units. Each of the inner link units includes two inner chain plates. Each of the inner chain plates has an inner waist section. At least one of the outer link units includes two outer chain plates. Each of the outer chain plates has an outer waist section that has a protruding part and a recessed part. A distance between the inner waist sections of each of the inner link units is smaller than a distance between the protruding parts of the outer chain plates of the at least one of the outer link units, and is equal to or smaller than a distance between the recessed parts of the at least one of the outer link units.

13 Claims, 11 Drawing Sheets

CHAIN AND TRANSMISSION MECHANISM HAVING THE SAME

CROSS-REFERENCE TO RELATED APPLICATION

This application claims priority to Taiwanese Invention Patent Application No. 109127079, filed on Aug. 10, 2020.

FIELD

The disclosure relates to a chain and a transmission mechanism, and more particularly to a chain and a transmission mechanism that are for a bike, a scooter or a motorcycle.

BACKGROUND

Figure 1:
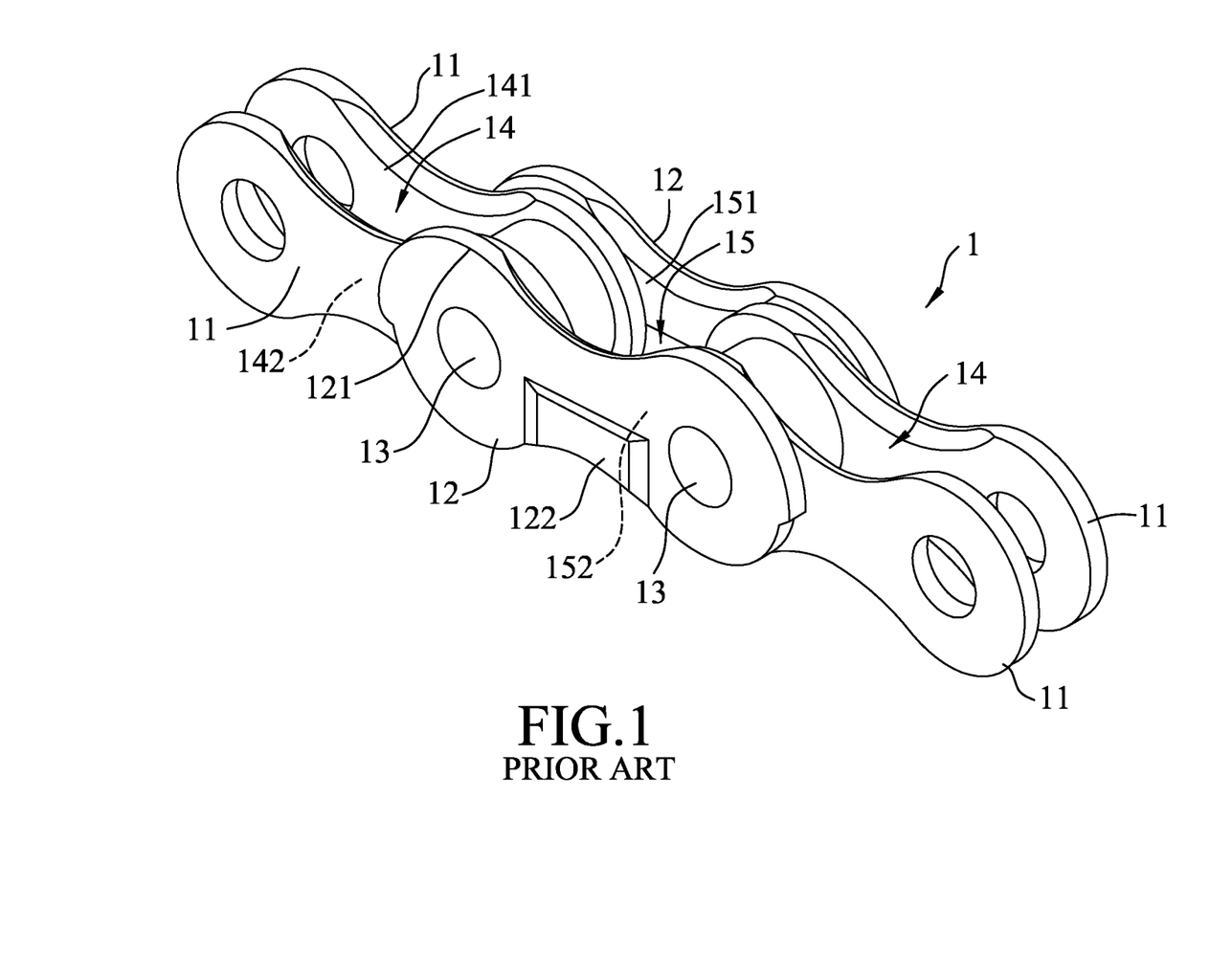
FIG. 1 is a perspective view of a portion of a conventional chain.
Figure 2:
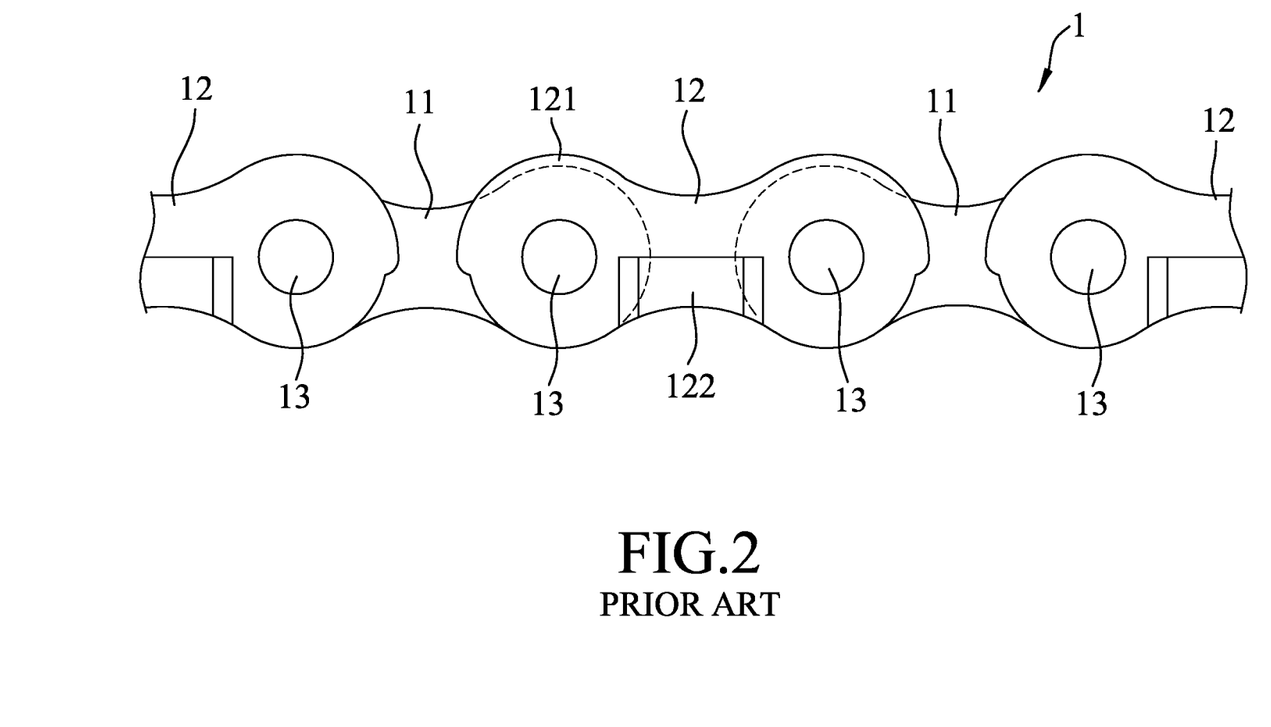
FIG. 2 is a fragmentary side view of a portion of the conventional chain.

Referring to FIGS. 1 and 2, a conventional chain 1 is used with two chainwheel sets (not shown) that are spaced apart in a front-rear direction to serve as a conventional transmission mechanism for a scooter, a motorcycle, or a multi-speed bike. Generally, each of the chainwheel sets includes a plurality of chainwheels that have respectively different diameters for a user to change gears, and each of the chainwheels has a plurality of teeth. The conventional chain 1 surrounds and meshes with one chainwheel of each of the chainwheel sets, and includes a plurality of inner chain plates 11, a plurality of outer chain plates 12 and a plurality of connecting rods 13. The outer chain plates 12 are divided into pairs, and each pair of the outer chain plates 12 are respectively located at two opposite sides of the inner chain plates 11, correspond in position to each other, and cooperatively define an outer meshing space 15 therebetween. The inner chain plates 11 are divided into pairs, and each pair of the inner chain plates 11 correspond in position to each other and cooperatively define an inner meshing space 14 therebetween. Each of the outer meshing space 15 and the inner meshing space 14 has a first opening 151,141 and a second opening 152,142 respectively distal from and proximate to the chainwheels that are surrounded by the conventional chain 1. Each of the first opening 151 and the second opening 152 of the outer meshing space 15 is larger than that of the inner meshing space 14. Each of the outer chain plates 12 has a flange portion 121 extending away from the chainwheels surrounded by the conventional chain 1, and a protruding portion 122 protruding away from the corresponding one of the outer chain plates 12 and corresponding in position to the second opening 152 of the outer meshing space 15 of the corresponding pair of the outer chain plates 12. Each of the connecting rods 13 interconnects a pair of the outer chain plates 12 and a corresponding pair of the inner chain plates 11.

When a user changes gear, the chain 1 is moved from one chainwheel to another. With the flange portions 121 of each pair of the outer chain plates 12, the chain 1 may be prevented from striking another chainwheel adjacent to the chainwheel that is meshed by the chain 1 when in movement, such that noise may be lessened. In addition, with the protruding portions 122 of each pair of the outer chain plates 12, the teeth of the chainwheel that the chain 1 is moved to may easily enter the outer meshing spaces 15 of the chain 1 through the second openings 152 of the outer meshing spaces 15, such that the chain 1 may smoothly mesh with the chainwheel. However, as the chain 1 rotates in a rotating direction, the teeth of the chainwheel meshed by the chain 1 may further get close to first openings 151 of the outer meshing spaces 15. Because the thickness of a distal end of each of the teeth is smaller than the width of the first opening 151 of the outer meshing space 15 of the corresponding pair of the outer chain plates 12, the chain 1 may be movable in a direction perpendicular to the rotating direction. That is to say, the chain 1 may wobble or may incline to one side of the teeth of the chainwheel when rotating, which generates noise or causes the chain 1 to fall off the chainwheel.

Furthermore, a guide pulley (not shown) that is generally used to move the chain 1 from a chainwheel to another enters the inner meshing spaces 14 with teeth thereof to mesh with the chain 1. Although the thickness of each of the teeth of the guide pulley corresponds to (i.e., substantially the same as) the width of each of the inner meshing spaces 14, the width of each of the outer meshing spaces 15 does not. Thus, the guide pulley may not be able to instantaneously move the chain 1 after entering the outer meshing spaces 15 with the teeth thereof. Consequently, the chain may feel sluggish when a user changes gear.

SUMMARY

Therefore, an object of the disclosure is to provide a chain that can alleviate at least one of the drawbacks of the prior art.

According to the disclosure, the chain includes a plurality of inner link units, a plurality of outer link units and a connecting rod unit. Each of the inner link units includes two inner chain plates that correspond in position to each other. Any two adjacent ones of the inner link units are spaced apart from each other in a revolving direction. Each of the inner chain plates has two inner connecting sections and an inner waist section that is located between the inner connecting sections. The inner waist sections of each of the inner link units cooperate with each other to define an inner meshing space therebetween. Any two adjacent ones of the outer link units are spaced apart from each other in the revolving direction. The outer link units and the inner link units are disposed in an alternating arrangement in the revolving direction. At least one of the outer link units includes two outer chain plates which correspond in position to each other and between which at least one of the inner link units is located. Each of the outer chain plates has two outer connecting sections and an outer waist section that is located between the outer connecting sections. The outer waist section has a protruding part, a recessed part, a first edge and a second edge. The protruding part and the recessed part are respectively located at two opposite sides of an imaginary central plane, and each interconnects the outer connecting sections. The first edge and the second edge respectively correspond in position to the protruding part and the recessed part. The outer waist sections of the at least one outer link unit cooperate with each other to define an outer meshing space therebetween. The outer meshing space has a wide opening that is located between the first edges of the outer chain plates, and a narrow opening that is located between the second edges of the outer chain plates. A distance between the inner waist sections of the inner chain plates of each of the inner link units is smaller than a distance between the protruding pats of the outer chain plates of the at least one of the outer link units, and is equal to or smaller than a distance between the recessed parts of the outer chain plates of the at least one of the outer link units. The connecting rod unit includes a plurality of connecting rods each interconnecting the inner chain plates of one of the inner link units and one of the outer link units via the inner connecting sections and the outer connecting sections.

Another object of the disclosure is to provide a transmission mechanism that can alleviate at least one of the drawbacks of the prior art.

According to the disclosure, the transmission mechanism includes a front chainwheel, a rear chainwheel, a tension pulley, a guide pulley and the chain as mentioned above. The chain is formed in a closed-loop shape, surrounds the front chainwheel, the rear chainwheel and the tension pulley, and defines a closed area therein. The wide opening and the narrow opening of the outer meshing space of the at least one outer link unit are respectively proximate to and distal from the closed area. The chain and each of the front chainwheel, the rear chainwheel, the tension pulley and the guide pulley mesh in a manner that the front chainwheel, the rear chainwheel and the tension pulley are located in the closed area while the guide pulley is located outside of the closed area.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Before the disclosure is described in greater detail, it should be noted that where considered appropriate, reference numerals or terminal portions of reference numerals have been repeated among the figures to indicate corresponding or analogous elements, which may optionally have similar characteristics.

Figure 3:
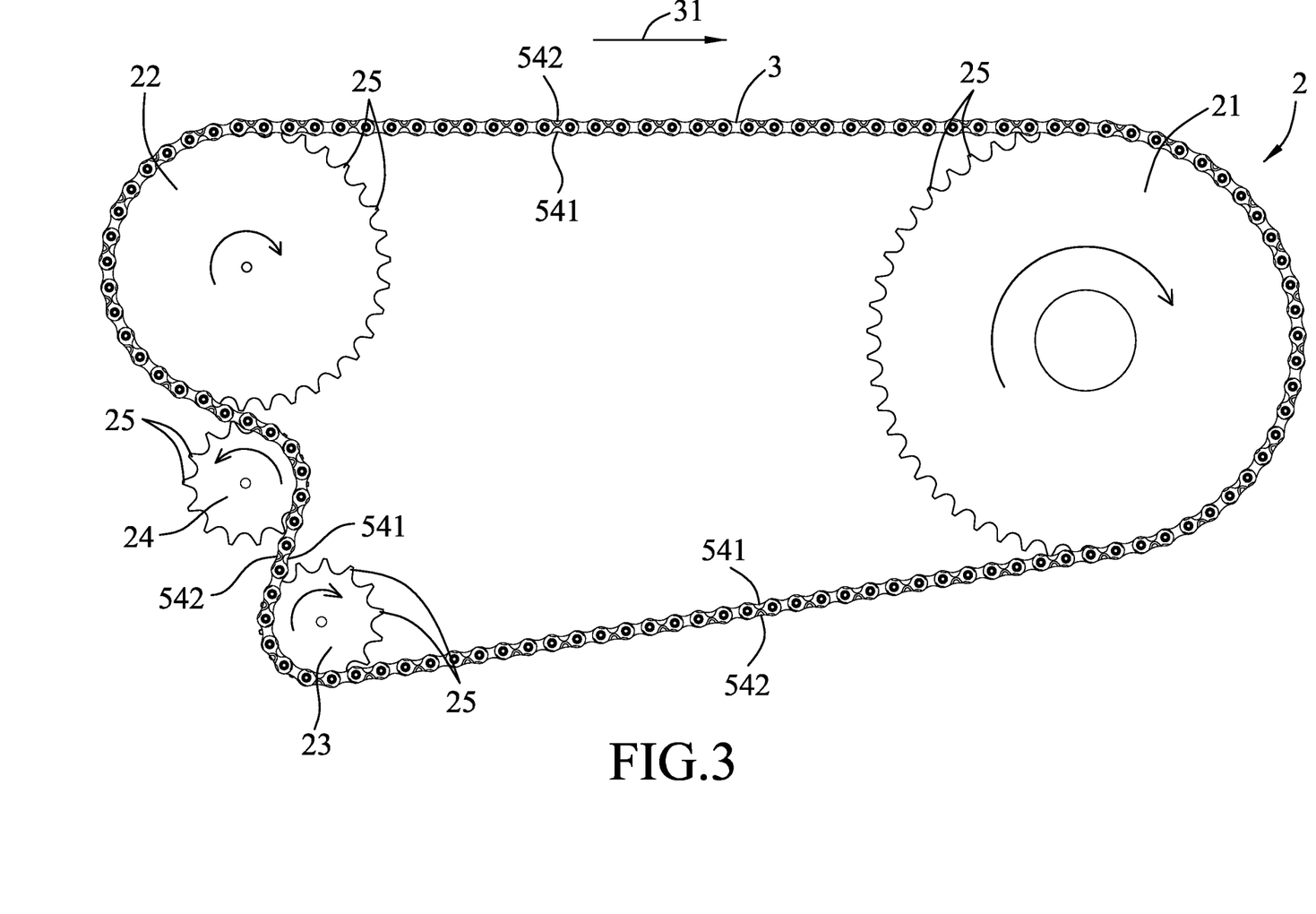
FIG. 3 is a side view of a first embodiment of a transmission mechanism according to the disclosure.
Figure 4:
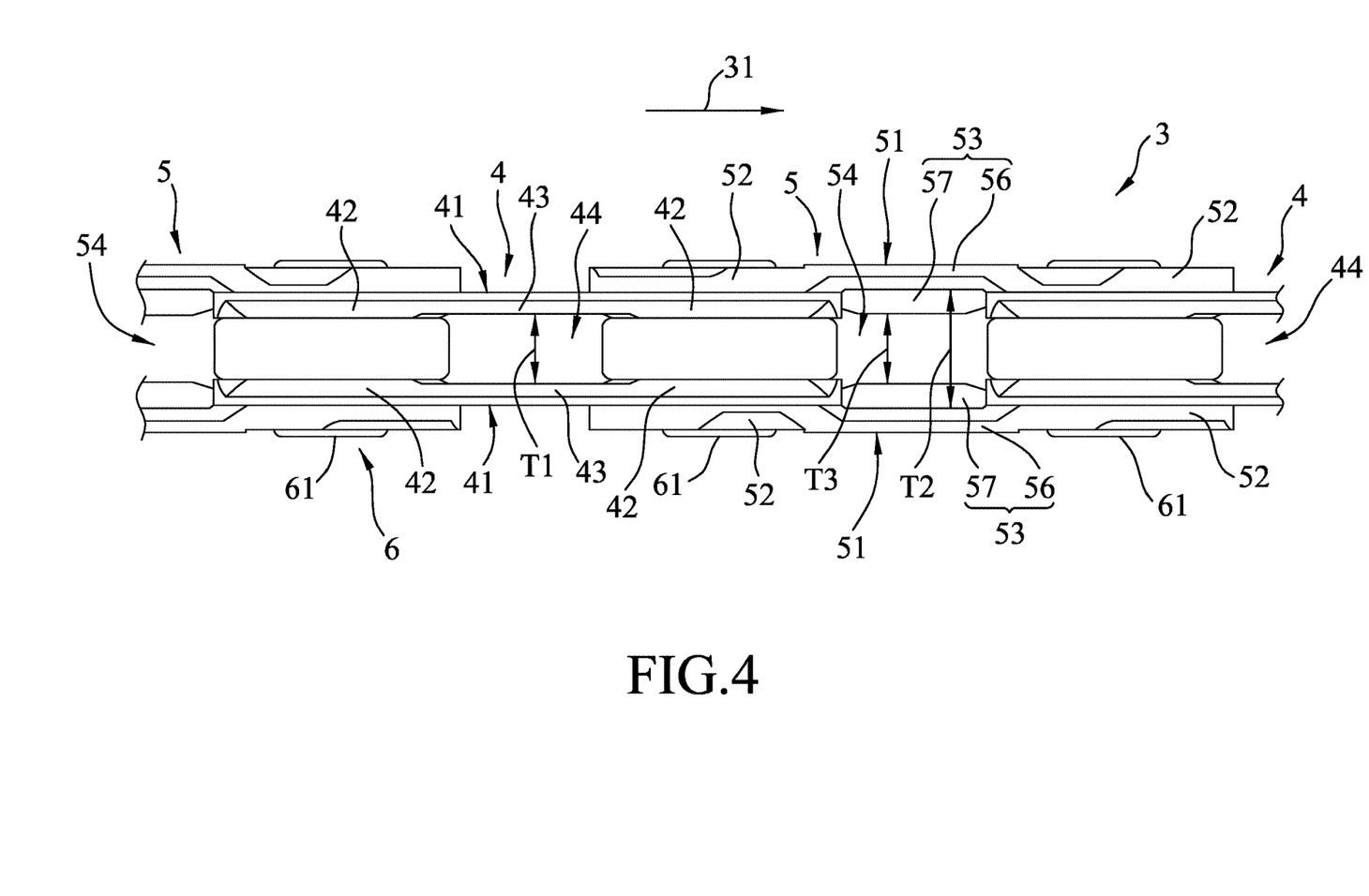
FIG. 4 is a fragmentary bottom view of a portion of a chain of the first embodiment taken from a closed area in the chain.

Referring to FIGS. 3 and 4, a first embodiment of a transmission mechanism. 2 according to the disclosure includes a plurality of front chainwheels 21 (only one is shown), a plurality of rear chainwheels 22 (only one is shown) located behind the front chainwheels 21, a tension pulley 23, a guide pulley 24 and a chain 3. The tension pulley 23 and the guide pulley 24 are closer to the rear chainwheels 22 than the front chainwheels 21. The guide pulley 24 is located between the rear chainwheels 22 and the tension pulley 23. The chain 3 is formed in a closed-loop shape and defines a closed area therein. In this embodiment, the chain 3 surrounds the tension pulley 23, one of the front chainwheels 21 and one of the rear chainwheels 22. The chain 3 meshes with the one of the front chainwheels 21, the one of the rear chainwheels 22, the tension pulley 23 and the guide pulley 24 in a manner that the one of the front chainwheels 21, the one of the rear chainwheels 22 and the tension pulley 23 are located in the closed area while the guide pulley 24 is located outside of the closed area. The front chainwheels 21 are concentrically mounted and have respectively different numbers of teeth 25. The rear chainwheels 22 are concentrically mounted and have respectively different numbers of teeth 25. Each of the tension pulley 23 and the guide pulley 24 has a plurality of teeth 25. The tension pulley 23 is used to keep the chain 3 in an optimal tension state. The guide pulley 24 is used to move the chain 3 from one rear chainwheel 22 to another one of the rear chainwheels 22 so that the chain 3 meshes with the another one of the rear chainwheels 22. The chain 3 is driveable to rotate in a revolving direction 31.

The chain 3 includes a plurality of inner link units 4, a plurality of outer link units 5 and a connecting rod unit 6. In other embodiments, the chain 3 may further include a bushing unit, a roller unit or other elements well-known in the art, but no further description will be given to those that are not considered as subject matters of this disclosure.

Any two adjacent ones of the inner link units 4 are spaced apart from each other in the revolving direction 31. Each of the inner link units 4 includes two inner chain plates 41 corresponding in position to each other. Each of the inner chain plates 41 has two inner connecting sections 42 spaced apart from each other in the revolving direction 31, and an inner waist section 43 located between the inner connecting sections 42. The inner waist sections 43 of each of the inner link units 4 cooperate with each other to define an inner meshing space 44 therebetween. The inner meshing space 44 has a first opening and a second opening respectively proximate to and distal from the closed area of the chain 3.

Any two adjacent ones of the outer link units 5 are spaced apart from each other in the revolving direction 31. The outer link units 5 and the inner link units 4 are disposed in an alternating arrangement in the revolving direction 31. At least one of the outer link units 5 includes two outer chain plates 51 which correspond in position to each other and between which at least one of the inner link units 4 is located. It is noted that, in this embodiment, each of the outer link units 5 includes two outer chain plates 51 corresponding in position to each other, and any two adjacent ones of the inner link units 4 are located between the outer chain plates 51 of a corresponding one of the outer link units 5. Each of the outer chain plates 51 has two outer connecting sections 52 spaced apart from each other in the revolving direction 31, and an outer waist section 53 located between the outer connecting sections 52. The outer waist sections 53 of each of the outer link units 5 cooperate with each other to define an outer meshing space 54 therebetween. The inner meshing spaces 44 of the inner link units 4 and the outer meshing spaces 54 of the outer link units 5 are arranged in the alternating arrangement in the revolving direction 31, and are for the teeth 25 of one of the front chainwheels 21 and the teeth 25 of one of the rear chainwheels 22 to enter.

The connecting rod unit 6 includes a plurality of connecting rods 61. Any two adjacent ones of the connecting rods 61 are spaced apart from each other in the revolving direction 31. Each of the connecting rods 61 interconnects the inner chain plates 41 of one of the inner link units 4 and the outer chain plates 51 of one of the outer link units 5 via the outer connecting sections 52 of the one of the outer link units 5 that correspond in position to each other, and via the inner connecting sections 42 of the one of the inner link units 4 that correspond in position to the outer connecting sections 52.

Figure 5:
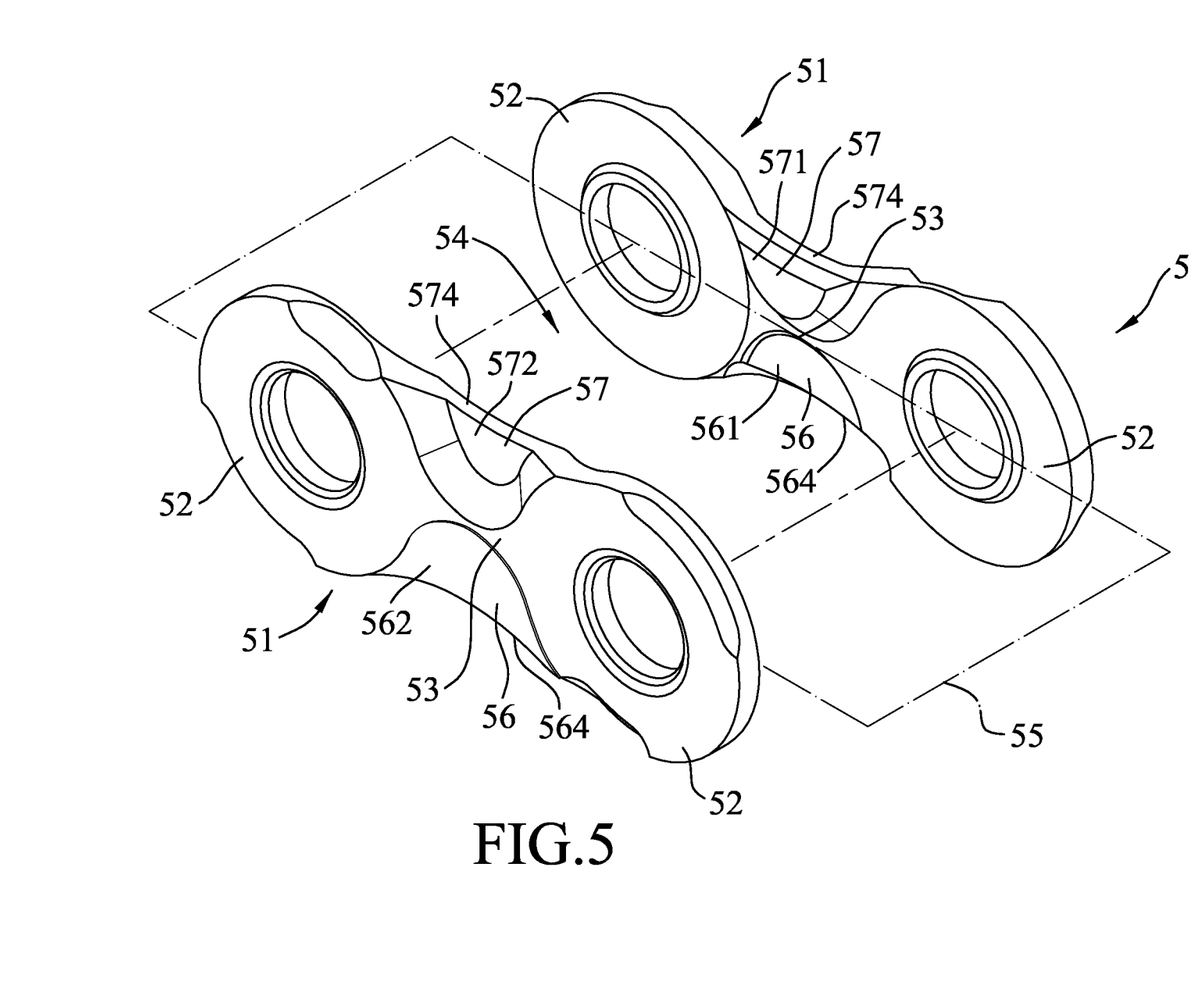
FIG. 5 is an exploded perspective view of one of outer link units of the first embodiment.
Figure 6:
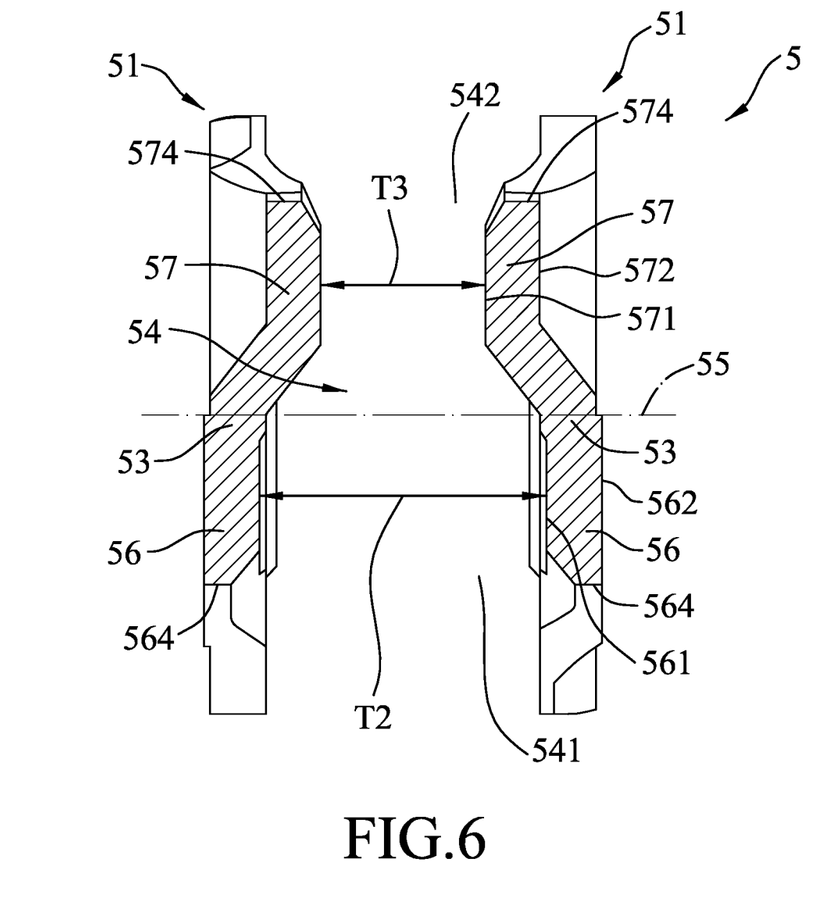
FIG. 6 is a sectional view of the one of the outer link units of the first embodiment.
Figure 7:
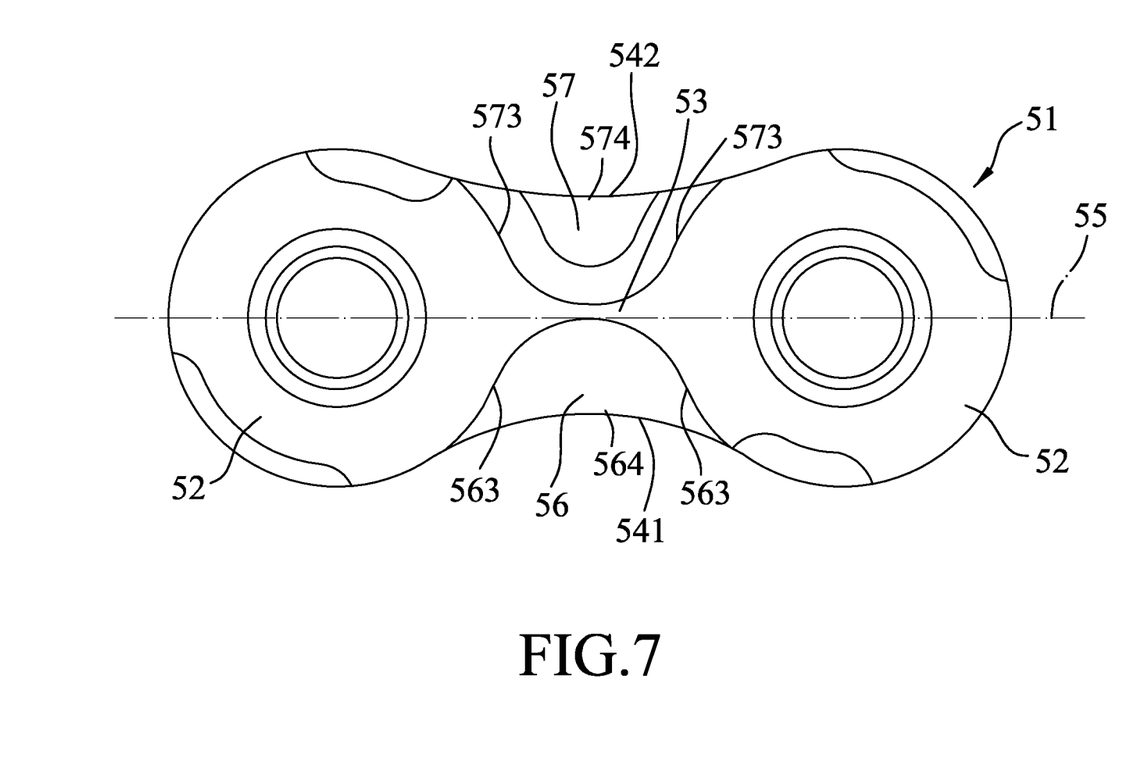
FIG. 7 is a side view of an outer chain plate of the first embodiment.

Referring further to FIGS. 5 to 7, the outer waist section 53 of each of the outer chain plates 51 has a protruding part 56, a recessed part 57, a first edge 565 and a second edge 574. The protruding part 56 and the recessed part 57 are respectively located at two opposite sides of an imaginary central plane 55. Specifically, the protruding part 56 and the recessed part 57 are respectively proximate to and distal from the closed area of the chain 3. The first edge 564 and the second edge 574 respectively correspond in position to the protruding part 56 and the recessed part 57. For each of the outer chain plates 51, the protruding part 56 and the recessed part 57 each interconnect the outer connecting sections 52 thereof. The protruding part 56 and the recessed part 57 of each of the outer chain plates 51 of each of the outer link units 5 extend respectively away from and toward the other one of the outer chain plates 51 of the outer link unit 5. Specifically, the protruding part 56 and the recessed part 57 of each of the outer chain plates 51 respectively have a wide inner surface 561 and a narrow inner surface 571 that face the outer meshing space 54, and that are respectively distal from and proximate to the outer waist section 53 of the other one of the outer chain plates 51. The protruding part 56 and the recessed part 57 of each of the outer chain plates 51 respectively have a wide outer surface 562 and a narrow outer surface 572 that are located at one side of the outer chain plate 51 opposite to the outer meshing space 54, and that are respectively distal from and proximate to the outer waist section 53 of the other one of the outer chain plates 51.

The outer meshing space 54 of each of the outer link units 5 has a wide opening 541 and a narrow opening 542. The wide opening 541 of each of the outer link units 5 is located between the first edges 564 of the outer link unit 5. The narrow opening 542 of each of the outer link units 5 is located between the second edges 574 of the outer link unit 5. That is to say, the wide opening 541 and the narrow opening 542 of each of the outer link units 5 are respectively proximate to and distal from the closed area of the chain 3. A distance (T1) (see FIG. 4) between the inner waist sections 43 of the inner chain plates 41 of each of the inner link units 4 is smaller than a distance (T2) between the protruding parts 56 of the outer chain plates 51 of each of the outer link units 5, and is equal to or smaller than a distance (T3) between the recessed parts 57 of the outer chain plates 51 of each of the outer link units 5. In this embodiment, the distance (T3) between the recessed parts 57 of the outer chain plates 51 of each of the outer link units 5 is smaller than the distance (T2) between the protruding parts 56 of the outer chain plates 51 of each of the outer link units 5, and is equal to the distance (T1) between the inner waist sections 43 of the inner chain plates 41 of each of the inner link units 4.

At least one of the protruding part 56 and the recessed part 57 of the outer waist section 53 of each of the outer chain plates 51 has two lateral edges 563, 573. In this embodiment, the protruding part 56 of each of the outer chain plates 51 has two lateral edges 563, and the recessed part 57 of each of the outer chain plates 51 has two lateral edges 573. Each of the lateral edges 563 of the protruding part 56 extends from the first edge 564 of the outer waist section 53 toward the imaginary central plane 55. Each of the lateral edges 573 of the recessed part 57 extends from the second edge 574 of the outer waist section 53 toward the imaginary central plane 55. In this embodiment, each of the lateral edges 563 of the protruding part 56 is arc-shaped, and a distance between the lateral edges 563 of the protruding part 56 decreases as the lateral edges 563 extend from the first edge 564 of the outer waist section 53 toward the imaginary central plane 55. Each of the lateral edges 573 of the recessed part 57 is arc-shaped, and a distance between the lateral edges 573 of the recessed part 57 decreases as the lateral edges 573 extend from the second edge 574 of the outer waist section 53 toward the imaginary central plane 55.

Therefore, the teeth 25 of the front and rear chainwheels 21, 22 and the tension and guide pulleys 23, 24 may enter and exit the outer meshing spaces 54 of the outer link units 5 more smoothly. It is noted that in other modifications of this embodiment, the lateral edges 563 of the protruding part 56 may not be arc-shaped while the lateral edges 573 of the recessed part 57 are arc-shaped, and vice versa.

In this embodiment, the chain 3 is driven by the one of the front chainwheels 21, or by the one of the rear chainwheels 22 that the chain 3 meshes with to rotate in the revolving direction 31. When the chain 3 rotates, the teeth 25 of the one of the front chainwheels 21 sequentially enter the outer meshing spaces 54 of the chain 3. With the wide openings 541 of the outer meshing spaces 54, the teeth 25 of the one of the front chainwheels 21 may easily enter the outer meshing spaces 54 so that the chain 3 may smoothly rotate while meshing with the one of the front chainwheels 21. As the chain rotates, the teeth 25 of the one of the front chainwheels 21 may further enter the narrow openings 542 of the outer meshing spaces 54. With the smaller distance (T3) between the recessed parts 57, the chain 3 may be restrained from moving in a direction different from the revolving direction 31, so that the chainline may not deviate from the revolving direction 31. That is to say, the chain 3 may be prevented from wobbling, from inclining to one side of the teeth 25 of the one of the front chainwheels 21, and from striking any one of the front chainwheels 21 and any one of the rear chainwheels 22 when it rotates. Therefore, less noise may be generated, and the rotation of the chain 3 may be stable and smooth.

When a user changes gear, the chain 3 is moved from one of the rear chainwheels 22 to another by the guide pulley 24. By virtue of the distance (T3) between the recessed parts 57 of each of the outer link units 5 being equal to the distance (T1) between the inner waist sections 43 of each of the inner link units 4, the teeth 25 of the guide pulley 24 may be restrained not only by the inner meshing spaces 44 but also by the outer meshing spaces 54 of the chain 3 through the openings of the inner meshing spaces 44 and the narrow openings 542 of the outer meshing spaces 54, respectively. Thus, the guide pulley 24 may react swiftly to a user's operation. That is to say, the guide pulley 24 may smoothly move the chain 3 from one of the rear chainwheels 22 to another as soon as a user changes gear, and the chain 3 may not feel sluggish. Furthermore, with the wide openings 541 of the outer meshing spaces 54, the teeth 25 of the another one of the rear chainwheels 22 that the chain 3 is moved to may easily enter the outer meshing spaces 54 so that the chain 3 may stably mesh with the another one of the rear chainwheels 22.

Figure 8:
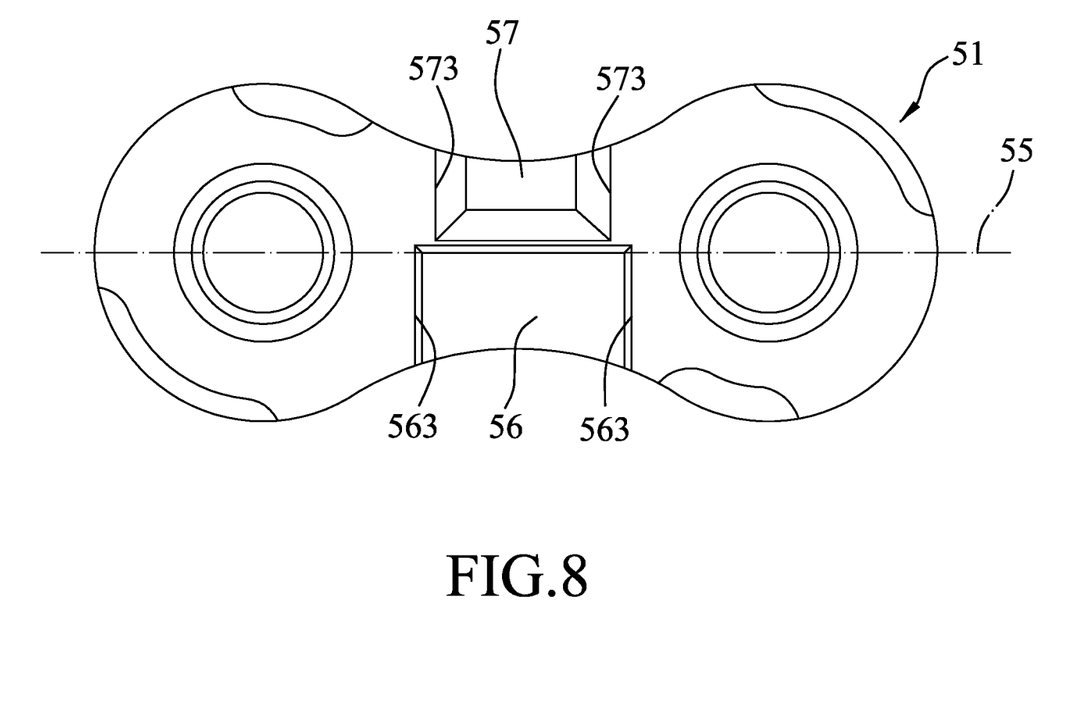
FIG. 8 is a side view of an outer chain plate of a second embodiment of the transmission mechanism according to the disclosure.

Referring to FIG. 8, a second embodiment of the transmission mechanism 2 according to the disclosure is similar to the first embodiment. A difference between the first and the second embodiment is that the lateral edges 563 of the protruding part 56 and the lateral edges 573 of the recessed part 57 of each of the outer chain plates 51 of the second embodiment are straight. Preferably, the lateral edges 563 of each of the protruding parts 56 in the second embodiment are straight and perpendicular to the imaginary central plane 55, and are parallel to each other. The lateral edges 573 of each of the recessed parts 57 in the second embodiment are straight and perpendicular to the imaginary central plane 55, and are parallel to each other.

Figure 9:
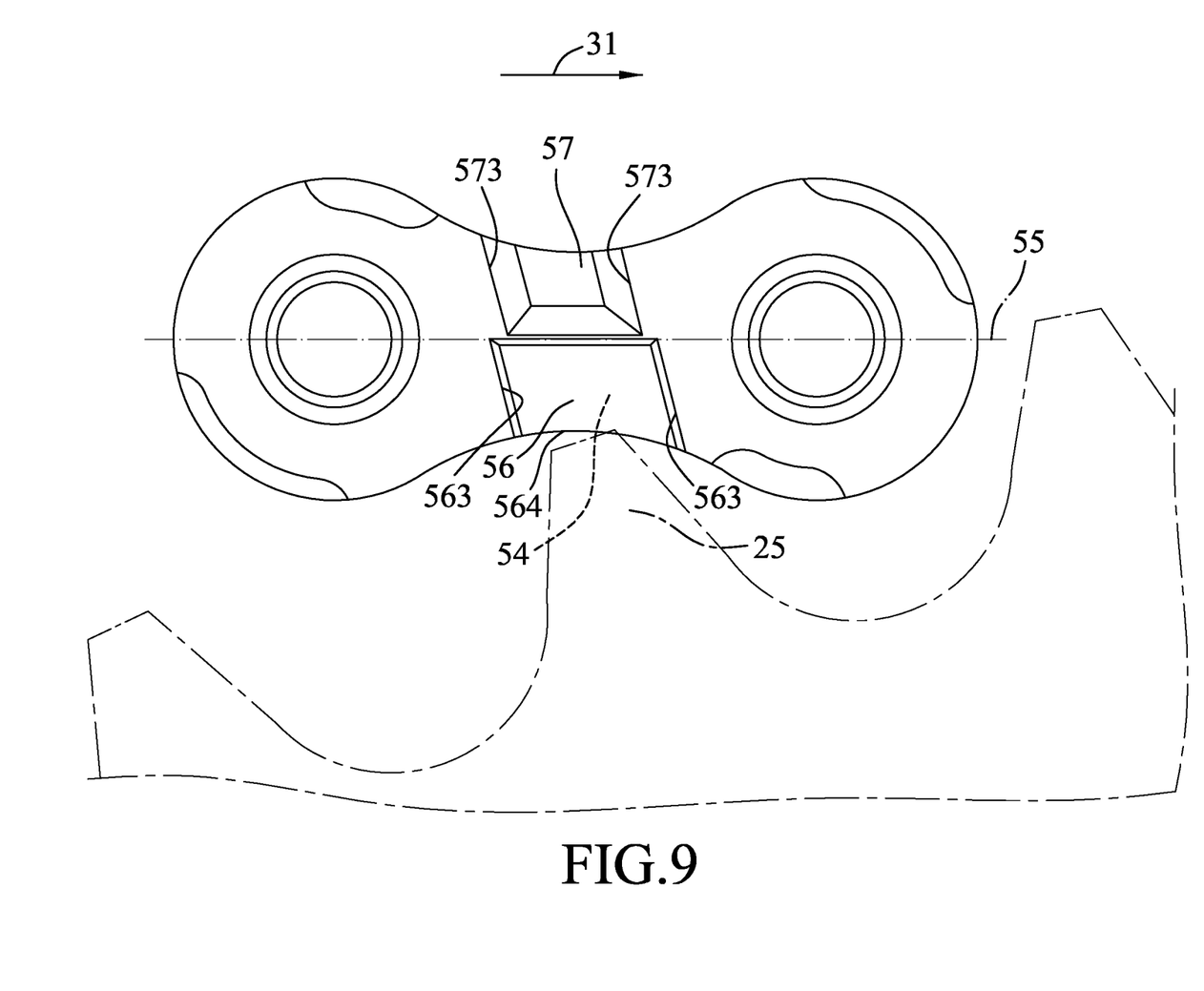
FIG. 9 is a side view of an outer chain plate of a third embodiment of the transmission mechanism according to the disclosure.

Referring to FIG. 9, a third embodiment of the transmission mechanism 2 according to the disclosure is similar to the second embodiment. Differences between the second and the third embodiment are that the lateral edges 563 of each of the protruding parts 56 and the lateral edges 573 of each of the recessed parts 57 in the third embodiment are oblique to the imaginary central plane 55, and that the lateral edges 563, 573 of each of the outer chain plates 51 in the third embodiment are inclined toward the first edge 564 of the outer chain plate 51 in the revolving direction 31. Therefore, the teeth 25 of the front chainwheels 21 and the rear chainwheels 22 may smoothly enter the outer meshing spaces 54 of the chain 3 along the inclination of the lateral edges 563. In addition, with the inclined lateral edges 563, 573, area of contact between the lateral edges 563, 573 and the teeth 25 are increased such that the transmission mechanism 2 may be more efficient.

Figure 10:
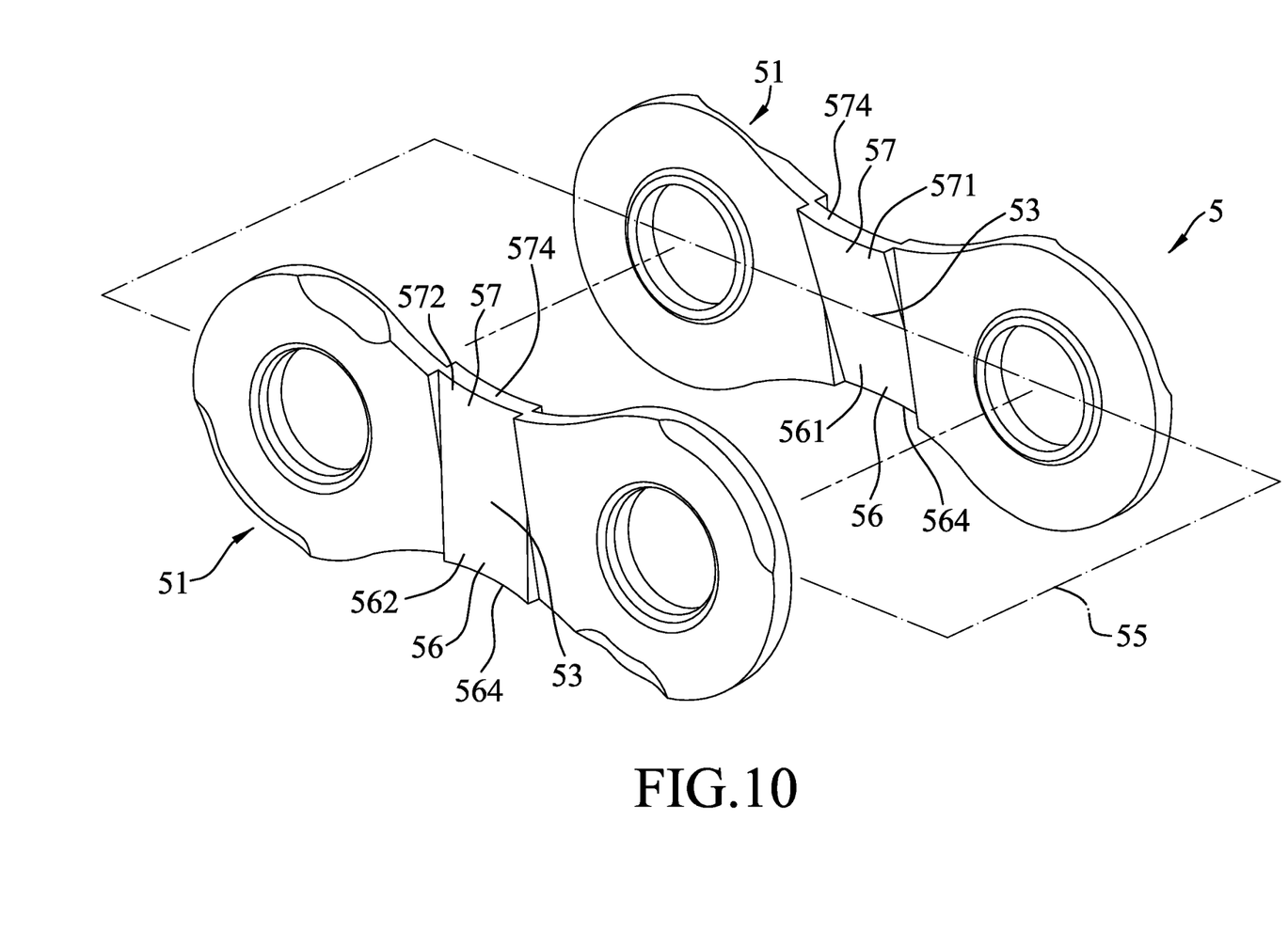
FIG. 10 is an exploded perspective view of one of outer link units of a fourth embodiment of the transmission mechanism according to the disclosure.
Figure 11:
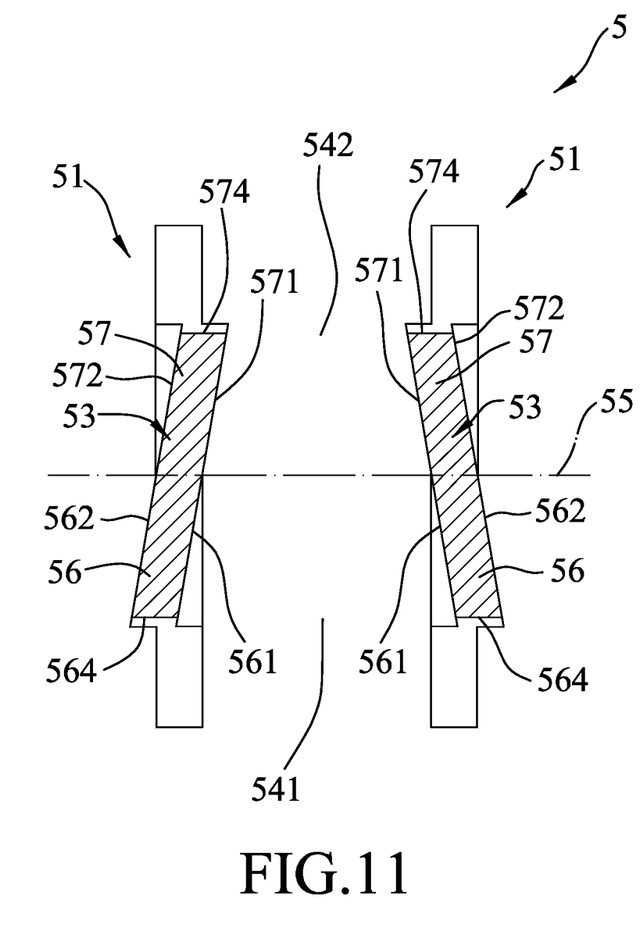
FIG. 11 is a sectional view of the one of the outer link units of the fourth embodiment.

Referring to FIGS. 10 and 11, a fourth embodiment of the transmission mechanism 2 according to the disclosure is similar to the second and the third embodiment. In the fourth embodiment, the protruding part 56 of one of the outer chain plates 51 of each of the outer link units 5 extends away from the other one of the outer chain plates 51 of the outer link unit 5 as the protruding part 56 slopes from the imaginary central plane 55 toward the first edge 564 of the one of the outer chain plates 51 so that the wide inner surface 561 and the wide outer surface 562 thereof are oblique to the imaginary central plane 55. The recessed part 57 of one of the outer chain plates 51 of each of the outer link units 5 extends toward the other one of the outer chain plates 51 of the outer link unit 5 as the recessed part 57 slopes from the imaginary central plane 55 toward the second edge 574 of the one of the outer chain plates 51 so that the narrow inner surface 571 and the narrow outer surface 572 thereof are oblique to the imaginary central plane 55. Specifically, in the fourth embodiment, the protruding part 56 and the recessed part 57 of each of the outer chain plates 51 are flush with each other so that the inclination of the outer waist section 53 of the outer chain plate 51 remains the same from the first edge 564 of the protruding part 56 to the second edge 574 of the recessed part 57. Therefore, the outer waist sections 53 of the chain 3 may be formed relatively easily. It is noted that, in other embodiments, the same effect may be achieved as long as one of the protruding part 56 and the recessed part 57 of each of the outer link units 5 slopes from the corresponding one of the first edge 564 and the second edge 574 of the outer waist section 53 toward the imaginary central plane 55.

In summary, by virtue of the distance (T3) between the recessed parts 57 of each of the outer link units 5 being smaller than the distance (T2) between the protruding parts 56 of the outer link unit 5, when a user changes gear, the chain 3 may be relatively smoothly moved from one rear chainwheel 22 to another one of the rear chainwheels 22, and the rotation of the chain 3 may be stable so that less noise may be generated.

Moreover, by virtue of the distance (T3) between the recessed parts 57 of each of the outer link units 5 being equal to the distance (T1) between the inner waist sections 43 of each of the inner link units 4, reaction time of the chain 3 when a user changes gear may be shortened. Therefore, the goals of the chain 3 and the transmission mechanism 2 are achieved.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A chain comprising:
   a plurality of inner link units each including two inner chain plates that correspond in position to each other, any two adjacent ones of said inner link units being spaced apart from each other in a revolving direction, each of said inner chain plates having two inner connecting sections and an inner waist section that is located between said inner connecting sections, said inner waist sections of each of said inner link units cooperating with each other to define an inner meshing space therebetween;
   a plurality of outer link units, any two adjacent ones of said outer link units being spaced apart from each other in the revolving direction, said outer link units and said inner link units being disposed in an alternating arrangement in the revolving direction, at least one of said outer link units including two outer chain plates which correspond in position to each other and between which at least one of said inner link units is located, each of said outer chain plates having
   two outer connecting sections and
   an outer waist section that is located between said outer connecting sections and that has
      a protruding part and a recessed part respectively located at two opposite sides of an imaginary central plane, and each interconnecting said outer connecting sections, and
      a first edge and a second edge respectively corresponding in position to said protruding part and said recessed part, said outer waist sections of said at least one outer link unit cooperating with each other to define an outer meshing space therebetween, said outer meshing space having a wide opening that is located between said first edges of said outer chain plates, and a narrow opening that is located between said second edges of said outer chain plates, a distance between said inner waist sections of said inner chain plates of each of said inner link units being smaller than a distance between said protruding parts of said outer chain plates of said at least one of said outer link units, and being equal to or smaller than a distance between said recessed parts of said outer chain plates of said at least one of said outer link units; and a connecting rod unit including a plurality of connecting rods each interconnecting said inner chain plates of one of said inner link units and one of said outer link units via said inner connecting sections and said outer connecting sections.

2. The chain as claimed in claim 1, wherein said protruding part and said recessed part of said outer waist section of each of said outer chain plates respectively have a wide inner surface and a narrow inner surface that face said outer meshing space, and that are respectively distal from and proximate to said outer waist section of the other one of said outer chain plates.

3. The chain as claimed in claim 2, wherein said protruding part and said recessed part of said outer waist section of each of said outer chain plates respectively have a wide outer surface and a narrow outer surface that are located at one side of said outer chain plate opposite to said outer meshing space, and that are respectively distal from and proximate to said outer waist section of the other one of said outer chain plates.

4. The chain as claimed in claim 1, wherein the distance between said recessed parts of said outer chain plates of said at least one of said outer link units is smaller the distance that between said protruding parts of said outer chain plates of said at least one of said outer link units, and is equal to the distance between said inner waist sections of said inner chain plates of each of said inner link units.

5. The chain as claimed in claim 1, wherein at least one of said protruding part and said recessed part of said outer waist section of each of said outer chain plates has two lateral edges, each of said lateral edges extending from the corresponding one of said first edge and said second edge of said outer waist section toward said imaginary central plane.

6. The chain as claimed in claim 5, wherein each of said lateral edges is arc-shaped, and a distance between said lateral edges decreases as said lateral edges extend from the corresponding one of said first edge and said second edge of said outer waist section toward said imaginary central plane.

7. The chain as claimed in claim 5, wherein said lateral edges are straight.

8. The chain as claimed in claim 5, wherein each of said lateral edges is straight and perpendicular to said imaginary central plane, said lateral edges being parallel to each other.

9. The chain as claimed in claim 5, wherein each of said lateral edges is straight and is oblique to said imaginary central plane, said lateral edges being parallel to each other.

10. The chain as claimed in claim 9, wherein each of said lateral edges is inclined toward said first edge in the revolving direction.

11. The chain as claimed in claim 1, wherein one of said protruding part and said recessed part of one of said outer chain plates slopes from the corresponding one of said first edge and said second edge of said outer waist section toward said imaginary central plane.

12. The chain as claimed in claim 11, wherein the other one of said protruding part and said recessed part of the one of said outer chain plates slopes from the corresponding one of said first edge and said second edge of said outer waist section toward said imaginary central plane, said protruding part and said recessed part of the one of said outer chain plates being flush with each other so that the inclination of said outer waist section remains the same from said first edge of said protruding part to said second edge of said recessed part.

13. A transmission mechanism comprising:
a front chainwheel;
a rear chainwheel located behind said front chainwheel;
a tension pulley;
a guide pulley; and
the chain of claim 1 formed in a closed-loop shape, surrounding said front chainwheel, said rear chainwheel and said tension pulley, and defining a closed area therein, said wide opening and said narrow opening of said outer meshing space of said at least one outer link unit being respectively proximate to and distal from said closed area, said chain and each of said front chainwheel, said rear chainwheel, said tension pulley and said guide pulley meshing in a manner that said front chainwheel, said rear chainwheel and said tension pulley are located in said closed area while said guide pulley is located outside of said closed area.

* * * * *